US010944532B2

United States Patent
Zhou et al.

(10) Patent No.: US 10,944,532 B2
(45) Date of Patent: Mar. 9, 2021

(54) METHOD AND APPARATUS FOR DATA TRANSMISSION

(71) Applicant: Beijing Xiaomi Mobile Software Co., Ltd., Beijing (CN)

(72) Inventors: Juejia Zhou, Beijing (CN); Li Wang, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 59 days.

(21) Appl. No.: 16/214,361

(22) Filed: Dec. 10, 2018

(65) Prior Publication Data

US 2019/0109694 A1    Apr. 11, 2019

Related U.S. Application Data

(63) Continuation of application No. PCT/CN2016/089932, filed on Jul. 13, 2016.

(51) Int. Cl.
*H04W 72/04* (2009.01)
*H04L 5/00* (2006.01)
(Continued)

(52) U.S. Cl.
CPC ......... *H04L 5/0055* (2013.01); *H04B 7/2656* (2013.01); *H04L 5/14* (2013.01);
(Continued)

(58) Field of Classification Search
CPC ... H04W 72/04; H04W 72/00; H04W 72/005; H04W 72/0446; H04L 5/00; H04L 5/14; H04L 5/0055; H04B 7/26; H04B 7/2656
See application file for complete search history.

(56) References Cited

U.S. PATENT DOCUMENTS

2013/0039193 A1   2/2013  Yin et al.
2014/0293883 A1*  10/2014 Wang ............... H04W 72/04
                                                         370/329
(Continued)

FOREIGN PATENT DOCUMENTS

CN    102271032 A    12/2011
CN    102624490 A     8/2012
(Continued)

OTHER PUBLICATIONS

Communication pursuant to Article 94(3) EPC of Europe Patent Application No. 17171892.7, dated Apr. 28, 2020, issued by European Patent Office.

*Primary Examiner* — Chi Ho A Lee
*Assistant Examiner* — Andrew Lee
(74) *Attorney, Agent, or Firm* — Finnegan, Henderson, Farabow, Garrett & Dunner, L.L.P.

(57) ABSTRACT

A method for data transmission, includes: determining configuration information of at least one flexible subframe included in a time division duplex (TDD) radio frame, wherein the at least one flexible subframe is configured to include at least one uplink transmission symbol and at least one downlink transmission symbol, and sub-timeslots occupied by the at least one uplink transmission symbol and the at least one downlink transmission symbol are alternately configured; transmitting the determined configuration information of the at least one flexible subframe to user equipment (UE) by using signaling; and according to the determined configuration information of the at least one flexible subframe, receiving uplink data in a sub-timeslot of the at least one uplink transmission symbol and sending downlink data in a sub-timeslot of the at least one downlink transmission symbol.

25 Claims, 6 Drawing Sheets

(51) Int. Cl.
*H04B 7/26* (2006.01)
*H04L 5/14* (2006.01)
*H04W 72/00* (2009.01)
*H04W 28/18* (2009.01)

(52) U.S. Cl.
CPC ..... *H04W 72/005* (2013.01); *H04W 72/0446* (2013.01); *H04W 28/18* (2013.01)

(56) References Cited

U.S. PATENT DOCUMENTS

| | | | |
|---|---|---|---|
| 2014/0293909 A1 | 10/2014 | Xu et al. | |
| 2015/0009870 A1* | 1/2015 | Bashar | H04L 67/02 370/280 |
| 2016/0295391 A1* | 10/2016 | Sartori | H04L 5/1469 |
| 2017/0063514 A1* | 3/2017 | Chen | H04W 76/27 |
| 2017/0086207 A1* | 3/2017 | Yokomakura | H04W 24/10 |
| 2017/0141908 A1* | 5/2017 | Kim | H04B 7/2615 |
| 2017/0272322 A1* | 9/2017 | You | H04L 41/0853 |
| 2018/0213529 A1* | 7/2018 | Lee | H04L 5/0048 |
| 2018/0263048 A1* | 9/2018 | Ingale | H04W 72/1215 |
| 2019/0116602 A1* | 4/2019 | Zhang | H04L 5/0073 |
| 2019/0158331 A1* | 5/2019 | Pawar | H04L 27/2611 |
| 2019/0165906 A1* | 5/2019 | Bala | H04J 11/00 |
| 2019/0387521 A1* | 12/2019 | Gao | H04W 72/0446 |

FOREIGN PATENT DOCUMENTS

| | | |
|---|---|---|
| CN | 103944668 A | 7/2014 |
| WO | WO 2016/122845 A1 | 8/2016 |
| WO | WO 2017/194023 A1 | 11/2017 |
| WO | WO 2016/014155 A1 | 1/2018 |

\* cited by examiner

| UL AND DL CONFIGURATION | TRANSITION PERIOD | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
←—————10MS—————→
FIG. 2
(Prior Art)
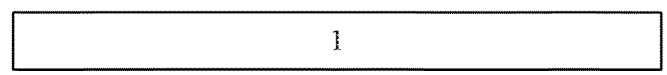
DOWNLINK SUBFRAME
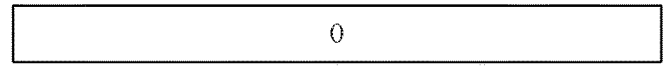
UPLINK SUBFRAME
FIG. 3
(Prior Art)

METHOD AND APPARATUS FOR DATA TRANSMISSION

CROSS-REFERENCE TO RELATED APPLICATION

This application is a continuation of International Application No. PCT/CN2016/089932, filed Jul. 13, 2016, the entire contents of which are incorporated herein by reference.

TECHNICAL FIELD

The disclosure generally relates to the field of mobile communications technologies, and more particularly, to a method and apparatus for data transmission.

BACKGROUND

With advances of wireless communications technologies and the increase of user requirements, wireless communications technologies have evolved from the earliest 2G (second Generation) through 3G and 4G to the latest 5G gradually. Major improvements in 5G are made in aspects such as data transmission rate, coverage, delay and capacity.

Since entry into the 5G stage, it becomes important to satisfy the service requirements by providing flexible service configurations for various services including broadband connection, Internet of Things, Internet of Vehicles, wide area coverage and the like. Current service types of 5G include multiple types such as enhanced Mobile Broad Band (eMBB), massive Machine Type Transmission (mMTC), and Ultra Reliable Low Latency Communication (URLLC).

For a URLLC service, an ultra-low delay is a design objective for a system. This requires the system to allocate a relatively large bandwidth to a user to perform transmission within a time as short as possible, and to return an acknowledgement (ACK)/a negative acknowledgement (NACK) feedback within a shortest time.

SUMMARY

According to a first aspect of the disclosure, a method for data transmission is provided. The method includes: determining configuration information of at least one flexible subframe included in a time division duplex (TDD) radio frame, wherein the at least one flexible subframe is configured to include at least one uplink transmission symbol and at least one downlink transmission symbol, and sub-timeslots occupied by the at least one uplink transmission symbol and the at least one downlink transmission symbol are alternately configured; transmitting the determined configuration information of the at least one flexible subframe to a user equipment (UE) by using signaling; and according to the determined configuration information of the at least one flexible subframe, receiving uplink data in a sub-timeslot of the at least one uplink transmission symbol and sending downlink data in a sub-timeslot of the at least one downlink transmission symbol.

According to a second aspect of the disclosure, a method for data transmission is provided. The method includes: receiving, from a base station, configuration information of at least one flexible subframe included in a time division duplex (TDD) radio frame, wherein the at least one flexible subframe is configured to include at least one uplink transmission symbol and at least one downlink transmission symbol, and sub-timeslots occupied by the at least one uplink transmission symbol and the at least one downlink transmission symbol are alternately configured; and according to the configuration information of the at least one flexible subframe, sending uplink data in a sub-timeslot of the at least one uplink transmission symbol, and receiving downlink data in a sub-timeslot of the at least one downlink transmission symbol.

According to a third aspect of the disclosure, an apparatus for data transmission is provided. The apparatus includes: a processor; and a memory configured to store instructions executable by the processor. The processor is configured to determine configuration information of at least one flexible subframe included in a time division duplex (TDD) radio frame, wherein the at least one flexible subframe is configured to include at least one uplink transmission symbol and at least one downlink transmission symbol, and sub-timeslots occupied by the at least one uplink transmission symbol and the at least one downlink transmission symbol are alternately configured; transmit the determined configuration information of the at least one flexible subframe to user equipment (UE) by using signaling; and according to the determined configuration information of the at least one flexible subframe, receive uplink data in a sub-timeslot of the at least one uplink transmission symbol and sending downlink data in a sub-timeslot of the at least one downlink transmission symbol.

According to a fourth aspect of the disclosure, an apparatus for data transmission is provided. The apparatus includes: a processor; and a memory configured to store instructions executable by the processor, wherein the processor is configured to: receive, from a base station, configuration information of at least one flexible subframe included in a time division duplex (TDD) radio frame, wherein the at least one flexible subframe is configured to include at least one uplink transmission symbol and at least one downlink transmission symbol, and sub-timeslots occupied by the at least one uplink transmission symbol and the at least one downlink transmission symbol are alternately configured; and according to the configuration information of the at least one flexible subframe, send uplink data in a sub-timeslot of the uplink transmission symbol and receive downlink data in a sub-timeslot of the downlink transmission symbol.

According to a fifth aspect of the disclosure, a non-transitory computer-readable storage medium having stored thereon instructions that, when executed by a processor of an apparatus, cause the apparatus to perform a method for data transmission, the method comprising: determining configuration information of at least one flexible subframe included in a time division duplex (TDD) radio frame, wherein the at least one flexible subframe is configured to include at least one uplink transmission symbol and at least one downlink transmission symbol, and sub-timeslots occupied by the at least one uplink transmission symbol and the at least one downlink transmission symbol are alternately configured; transmitting the determined configuration information of the at least one flexible subframe to user equipment (UE) by using signaling; and according to the determined configuration information of the at least one flexible subframe, receiving uplink data in a sub-timeslot of the at least one uplink transmission symbol and sending downlink data in a sub-timeslot of the at least one downlink transmission symbol.

It should be understood that the foregoing general description and the following detailed description are merely exemplary, and cannot cause any limitation to the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 2 is a schematic diagram of a TDD radio frame in prior art.

FIG. 3 is a schematic diagram of two conventional subframes in a TDD radio frame in prior art.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

A method for data transmission provided in the embodiments of the disclosure involves two ends of wireless transmission, which are a base station (for example, a NodeB) and user equipment (UE). The base station and the UE can communicate with each other in a Time Division Duplexing (TDD) manner. The base station and the UE may transmit uplink data and downlink data in different uplink timeslots and downlink timeslots.

Figure 1:
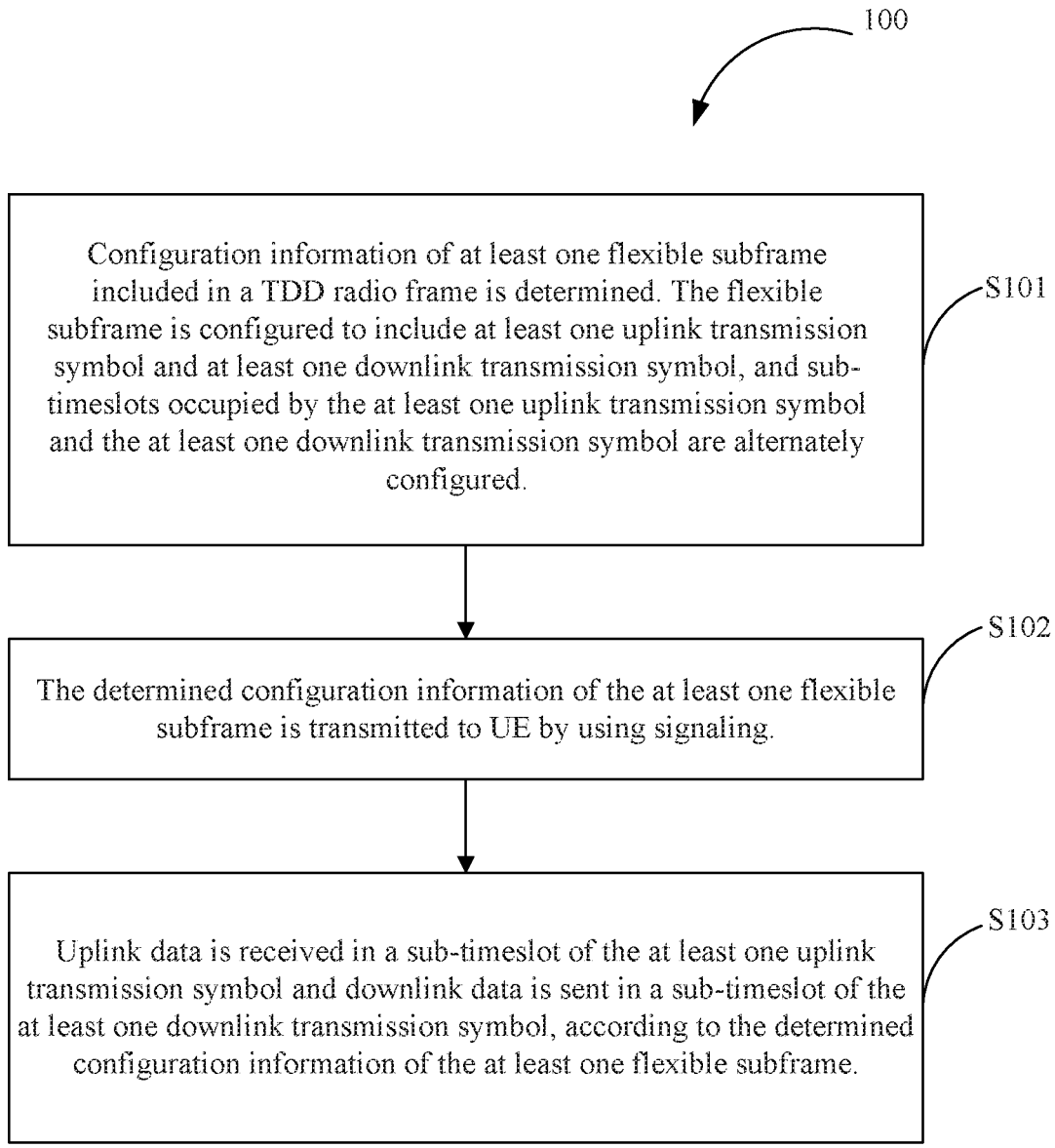
FIG. 1 is a flowchart of a method for data transmission according to an exemplary embodiment.

An embodiment of the disclosure provides a method 100 for data transmission. Referring to FIG. 1, the method 100 implemented on a base station side may include the following steps.

In step S101, configuration information of at least one flexible subframe included in a TDD radio frame is determined. The flexible subframe is configured to include at least one uplink transmission symbol and at least one downlink transmission symbol, and sub-timeslots occupied by the at least one uplink transmission symbol and the at least one downlink transmission symbol are alternately configured.

In step S102, the determined configuration information of the at least one flexible subframe is transmitted to UE by using signaling.

In step S103, uplink data is received in a sub-timeslot of the at least one uplink transmission symbol and downlink data is sent in a sub-timeslot of the at least one downlink transmission symbol, according to the determined configuration information of the at least one flexible subframe.

In the method 100, at least one flexible subframe included in a TDD radio frame for transmission is configured to include at least one uplink transmission symbol and at least one downlink transmission symbol. Sub-timeslots occupied by the uplink transmission symbol and the downlink transmission symbol are alternately configured. In comparison, in a subframe configuration solution of a TDD radio frame in related prior art, one subframe (uplink subframe or downlink subframe) includes only a same type of transmission symbols (i.e., an uplink subframe includes only uplink transmission symbols, and a downlink subframe includes only downlink transmission symbols). As such, a flexible subframe provided by the method 100 enables configuration of uplink and downlink transmission symbols in a same subframe, so that feedback of an acknowledgement message from the UE can be rapidly performed, a transmission latency is reduced, and at the same time the number of UEs that can be connected may be increased by several times.

In an embodiment, in step S101, the determined flexible subframe may include one or more uplink transmission symbols and one or more downlink transmission symbols. Sub-timeslots occupied by all uplink transmission symbols and downlink transmission symbols are disposed alternately with each other. The flexible subframe is a new subframe that is different from a TDD subframe in related prior art, and may internally include alternately disposed sub-timeslots that are occupied by the uplink transmission symbols and the downlink transmission symbols.

In related prior art, a TDD mode refers to a mode in which a same operating frequency band is used for uplink and downlink, and an uplink signal and a downlink signal are transmitted at different time periods. Referring to FIG. 2 which illustrates a frame structure of a radio frame in a TDD system in prior art, one radio frame has a length of 10 ms, and includes ten subframes in total which are classified into two types (that is, special subframe and conventional subframe). Each subframe has a length of 1 ms. The conventional subframe includes an uplink subframe (represented by a letter U) and a downlink subframe (represented by a letter D). The special subframe (represented by a letter S) includes three timeslots, that is, a Downlink Pilot Timeslot (DwPTS), a guard period (GP), and an Uplink Pilot Timeslot (UpPTS). The uplink subframe and the downlink subframe are used to transmit uplink and downlink control signaling and service data. FIG. 2 shows seven possible subframe configuration schemes.

In related prior art, shown in FIG. 3, one uplink subframe or one downlink subframe includes only a same type of symbols. For example, a downlink subframe includes only downlink transmission symbols (represented by the number 1), and an uplink subframe includes only uplink transmission symbols (represented by the number 0). Because one uplink subframe or downlink subframe lasts 1 ms according to the structure of the TDD radio frame in related prior art, a NodeB may wait longer than several milliseconds for UE to report an ACK message/a NACK message in a scenario where the UE reports the ACK message/the NACK message and the NodeB determines, according to the ACK/NACK message, a time and a manner of retransmitting data. For example, if the second configuration D/D/D/S/U in FIG. 2 is used for performing data transmission (that is, one uplink subframe is configured for three downlink subframes), the NodeB needs to send three downlink subframes in the downlink and wait one timeslot before the NodeB may receive one uplink subframe, so that the latency is longer than 4 ms. Therefore, a latency less than 1 ms required by URLLC cannot be met in related prior art.

To resolve the foregoing problems and reduce a transmission delay, the method 100 improves the structures of the uplink subframe and the downlink subframe in related prior art, such that configuration of sub-timeslots corresponding to uplink and downlink transmission symbols can be flexibly implemented in one subframe. As a result, the UE may perform feedback of an ACK message/a NACK message within a relatively short time (e.g., at least shorter than 1 ms), thereby greatly reducing a transmission latency.

In exemplary embodiments, the base station may set locations and lengths of uplink and downlink transmission symbols in a flexible subframe of a TDD radio frame, according to service, network capacity, interference and the like. A preset length, for example, 1 ms, can be kept unchanged for a total length of the flexible subframe. As a sub-structure in a frame, the flexible subframe may be configured to include at least one uplink transmission symbol and at least one downlink transmission symbol. In terms of slot, a sub-structure of a frame may be one or more slots or mini slots. Thus, the implementation of flexibly configuring a subframe shall not be regarded as limiting, because there are multiple variants thereof. For example, one or more slots or mini slots in a subframe may be configured to include at least one uplink transmission symbol and at least one downlink transmission symbol. Moreover sub-timeslots occupied by the at least one uplink transmission symbol and the at least one downlink transmission symbol are alternately configured.

In one embodiment, all or some of conventional subframes (including uplink and downlink subframes) in a TDD radio frame in related prior art may be replaced with flexible subframes provided in the present disclosure. The structure of the special subframe in the related prior art may be kept unchanged. For example, the structure of the subframe D or U in FIG. 2 (each subframe includes a same type of transmission symbols) continues to be used for some subframes, and the structure of the flexible subframe provided in the present disclosure is used for other subframes. Alternatively, the structure of all conventional subframes in the TDD radio frame may be replaced with the structure of the flexible subframe provided in the present disclosure.

Figure 4:
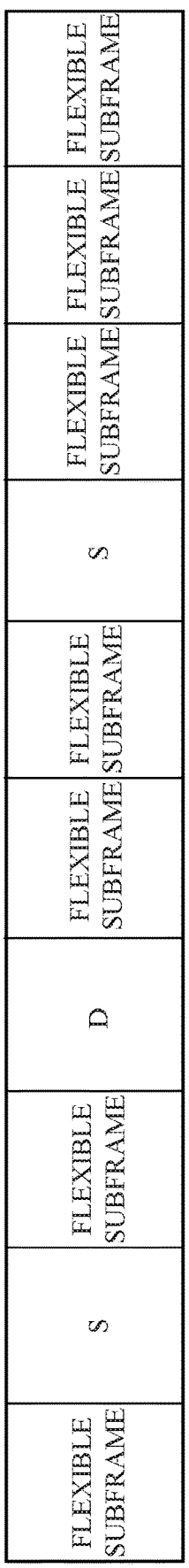
FIG. 4 is a schematic diagram of a TDD radio frame according to an exemplary embodiment.

For example, if the second configuration shown in FIG. 2 is used, the flexible subframe structure may be used for all of the eight subframes at the locations U and D, and the structures of the eight subframes may be the same or different. Alternatively, as shown in FIG. 4, seven of the eight subframes may have the structure of the flexible subframe.

In some embodiments, determining configuration information of a flexible subframe in a TDD radio frame in step 101 may further include: setting a GP in the flexible subframe. The GP is located between a downlink transmission symbol and an uplink transmission symbol at transition from the downlink transmission symbol to the uplink transmission symbol.

In an embodiment, for a same flexible subframe, a GP may be further set between a downlink transmission symbol and an adjacent uplink transmission symbol at transition from the downlink transmission symbol to the uplink transmission symbol.

In a same flexible subframe, when a transition from a downlink transmission symbol to an uplink transmission symbol (the uplink transmission symbol immediately follows the downlink transmission symbol) occurs according to a chronological order, it is required to set a GP between the downlink transmission symbol and the uplink transmission symbol that immediately follows the downlink transmission symbol. On one hand, the GP located at transition from the downlink transmission symbol to the uplink transmission symbol serves to prevent the uplink signal from being interfered by the downlink signal; on the other hand, due to presence of the GP, when multiple UEs exist, synchronization between the multiple UEs can be ensured, thereby avoiding a blockage during data transmission, and improving the efficiency of data transmission.

In exemplary embodiments, a structure of a flexible subframe enables alternate transition between uplink and downlink, as long as a GP is set at transition from a downlink transmission symbol to an uplink transmission symbol. Locations and lengths of an uplink transmission symbol, a downlink transmission symbol, and a GP in each flexible subframe are not limited in the present disclosure, and may be determined comprehensively according to service requirements, network coverage, capacity, interference and the like.

Figure 5A:
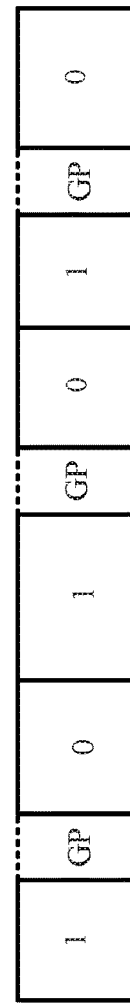
FIG. 5A is a schematic diagram of a flexible subframe according to an exemplary embodiment.

A structure of an exemplary flexible subframe is shown in FIG. 5A. In the example shown in FIG. 5A, the flexible subframe includes three GPs, which are respectively located at transitions from three downlink subframes into their respective uplink subframes.

In another embodiment, a GP may be configured to be located between a downlink transmission symbol and an uplink transmission symbol in adjacent flexible subframes at transition from the downlink transmission symbol to the uplink transmission symbol.

For example, when a downlink transmission symbol exists at the tail of a previous subframe of a current flexible subframe (the previous subframe may be a conventional downlink subframe or a flexible subframe) and an uplink transmission symbol exists at the head of the current flexible subframe, a GP may be set before the uplink transmission symbol at the head of the current flexible subframe.

In the exemplary embodiment, in addition to setting a GP between transmission symbols in a same flexible subframe, it may be further necessary to set a GP between a flexible subframe and another flexible subframe and/or set a GP between a flexible subframe and a conventional subframe. In this case, if a previous subframe is a downlink subframe in which, for example, all symbols are downlink transmission symbols, or if a transmission symbol at the tail of a previous subframe is a downlink transmission symbol, it may be necessary to set a GP at the head of a current flexible subframe, that is, before an uplink transmission symbol that appears for the first time in the current flexible subframe.

Figure 5B:
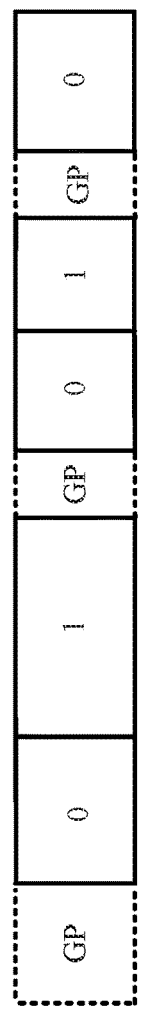
FIG. 5B is a schematic diagram of a flexible subframe according to another exemplary embodiment.

A structure of an exemplary flexible subframe is shown in FIG. 5B. In the example shown in FIG. 5B, a GP exists at the head of a flexible subframe. In addition, two more GPs are further included, similar to that in FIG. 5A.

In the method 100, a structure of the determined flexible subframe is not limited to the two structures in FIG. 5A and FIG. 5B, and various forms may be used as long as the configuration principle is met. The structure of a flexible subframe is not limited in the present disclosure.

In some embodiments, different GPs in a same flexible subframe may have the same length or may have different lengths. This may be determined according to lengths of uplink and downlink transmission symbols.

In an embodiment, the at least one flexible subframe may include at least one dynamically configured flexible subframe. Correspondingly, step S101 may be implemented as: periodically determining a location, occupation information, and a time length for each sub-timeslot in the dynamically configured flexible subframe.

A dynamically configured flexible subframe means that each part of the dynamically configured flexible subframe may be configured and reconfigured during various periods.

For a dynamically configured flexible subframe, locations, lengths, and ratios of uplink transmission symbols, downlink transmission symbols, and GPs in the dynamically configured flexible subframe can be completely changed during various periods. The lengths, locations, and ratios of all the uplink transmission symbols, downlink transmission symbols, and GPs can be dynamically changed.

Figure 6:
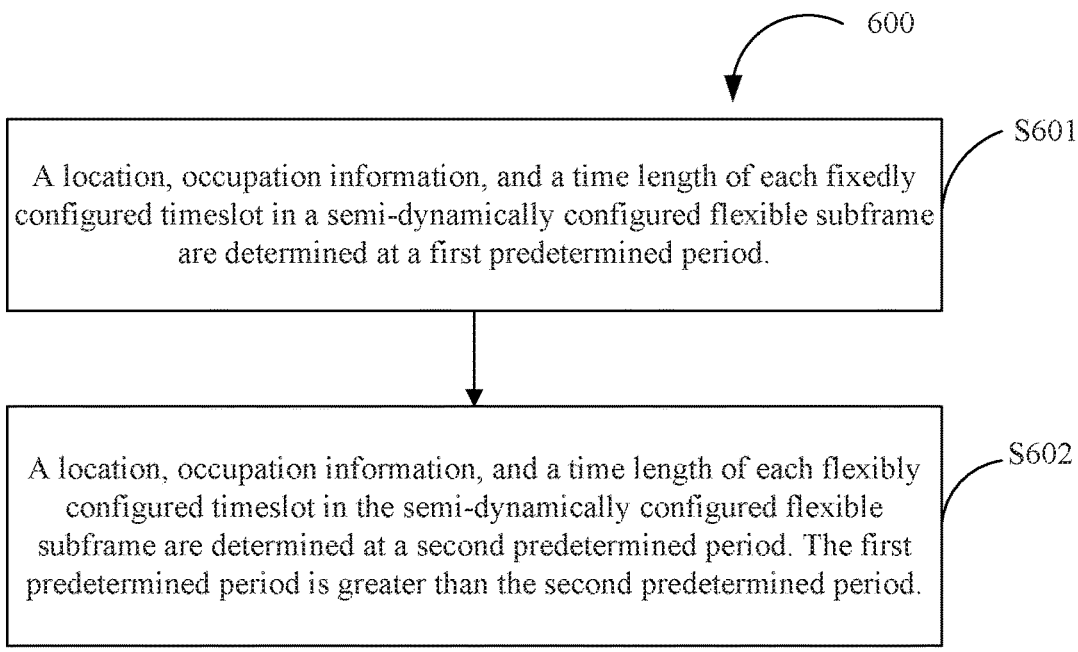
FIG. 6 is a flowchart of a method for determining configuration information of a semi-dynamically configured flexible subframe according to an exemplary embodiment.

In some embodiments, the at least one flexible subframe may include a semi-dynamically configured flexible subframe. The semi-dynamically configured flexible subframe may include at least one fixedly configured timeslot and at least one flexibly configured timeslot. Accordingly, step S101 may be implemented in FIG. 6 which shows a flowchart of a method 600 for data transmission according to another exemplary embodiment.

In step S601, a location, occupation information, and a time length of each fixedly configured timeslot in a semi-dynamically configured flexible subframe are determined at a first predetermined period.

In step S602, a location, occupation information, and a time length of each flexibly configured timeslot in the semi-dynamically configured flexible subframe are determined at a second predetermined period. The first predetermined period is greater than the second predetermined period.

Fixedly configured timeslots and flexibly configured timeslots have different configuration periods. Accordingly, in step S102, after a location, occupation information, and a time length of each fixedly configured timeslot are determined, it may be required to send information about locations, occupation information, and time lengths of these fixedly configured timeslots to the UE by using preset signaling. Similarly, after a location, occupation information, and a time length of each flexibly configured timeslot are determined, it may be required to send information about locations, occupation information, and time lengths of these flexibly configured timeslots to the UE by using preset signaling.

In an embodiment, a configuration period of fixedly configured timeslots may be infinitely large. Thus, it is only needed to configure just once the fixedly configured timeslots which no longer change thereafter, but to keep changing the flexibly configured timeslots at a relatively short period.

In step S102, there may be multiple types of preset signaling. For example, the preset signaling may be any one of the following signaling: broadcast signaling, radio resource control (RRC) signaling, and physical layer signaling. The present disclosure is not limited to the above signaling.

The period length for fixedly configured timeslots and/or flexible configured timeslots may be determined according to a period of used signaling. For example, a period configured for broadcast signaling is relatively long, and is about 640 ms. A period configured for RRC signaling is moderate, and is from about 100 ms to about 200 ms. A period configured for physical layer signaling may be the shortest, and may be about 10 ms or even shorter.

In steps S601 and S602, at a relatively short period, a location, occupation information, and a time length of a non-fixedly configured timeslot in a flexible subframe may be changed through configuration. During these relatively short periods, a structure of only a non-fixedly configured timeslot in the flexible subframe can be changed, and the structure information of the changed part can be sent to the UE. A location, occupation information, and a time length of a fixedly configured timeslot in a flexible subframe may be changed only at a relatively long period. Compared with a dynamically configured flexible subframe, such a data transmission manner may save overheads of control signaling, and facilitate finding out which symbols may potentially cause interference in an interference cancellation process.

In the exemplary embodiment, the first predetermined period is greater than the second predetermined period. As a result, the signaling used in step S601 and the signaling used in step S602 usually have different periods. For example, if broadcast signaling is used to send structure information of fixedly configured timeslots in a flexible subframe, reconfiguration may take place only about every 640 ms. For non-fixedly configured timeslots in the flexible subframe, signaling having a relatively short period may be used to perform configuration. For example, when physical layer signaling is used, configuration may take place every 10 ms or even shorter. The configuration of the non-fixedly configured timeslots needs shorter-period signaling. Generally speaking, the semi-dynamically configured flexible subframe saves more signaling overheads compared with the dynamically configured flexible subframe.

Figure 7:
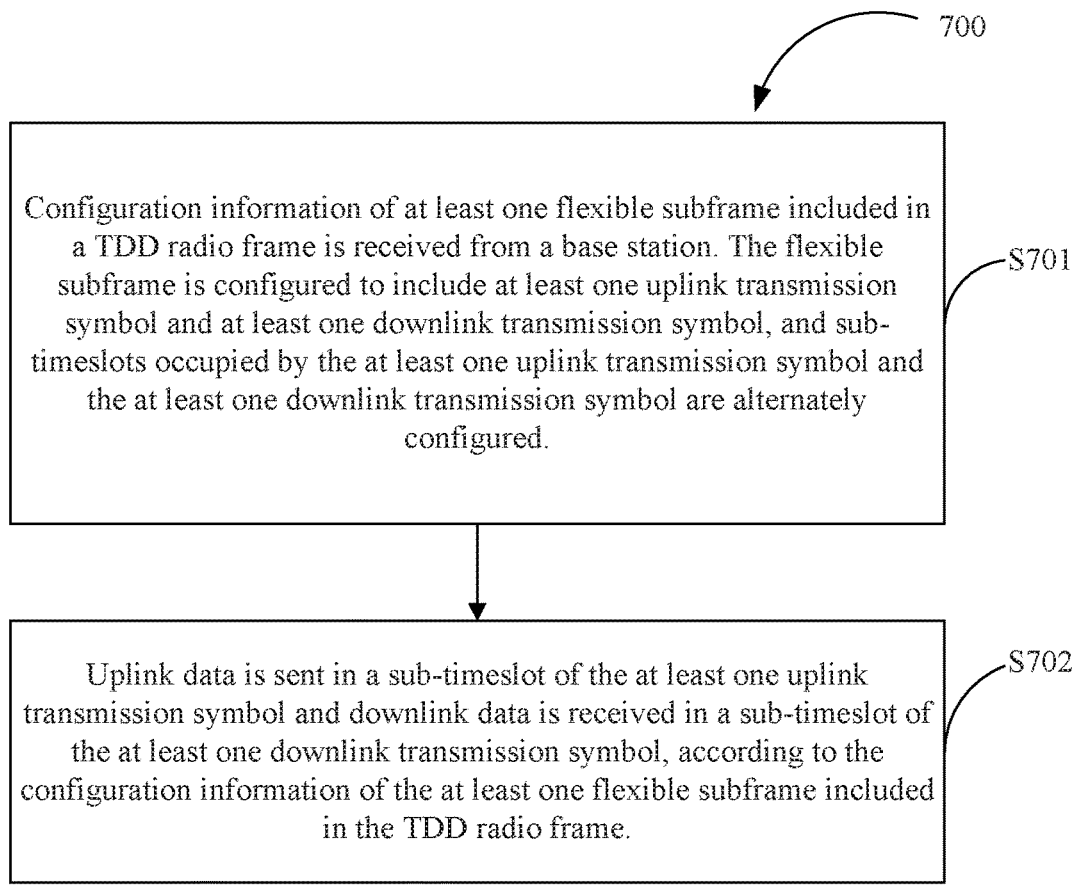
FIG. 7 is a flowchart of a method for data transmission according to an exemplary embodiment.

FIG. 7 is a flowchart of a method 700 for data transmission according to another exemplary embodiment. For example, the method 700 may be implemented on a UE side, and may include the following steps.

In step S701, configuration information of at least one flexible subframe included in a TDD radio frame is received from a base station. The flexible subframe is configured to include at least one uplink transmission symbol and at least one downlink transmission symbol, and sub-timeslots occupied by the at least one uplink transmission symbol and the at least one downlink transmission symbol are alternately configured.

In step S702, uplink data is sent in a sub-timeslot of the at least one uplink transmission symbol and downlink data is received in a sub-timeslot of the at least one downlink transmission symbol, according to the configuration information of the at least one flexible subframe included in the TDD radio frame.

In the method 700, a UE receives configuration information of a flexible subframe included in a TDD radio frame from a base station. The flexible subframe includes at least one uplink transmission symbol and at least one downlink transmission symbol, and sub-timeslots occupied by the uplink transmission symbol and the downlink transmission symbol are alternately configured. In contrast, in a subframe configuration solution of a TDD radio frame in related prior art, one subframe (uplink subframe or downlink subframe) includes only a same type of transmission symbols (i.e., an uplink subframe includes only uplink transmission symbols, and a downlink subframe includes only downlink transmission symbols). As such, a flexible subframe provided by the method 700 enables configuration of uplink and downlink transmission symbols in a same subframe, so that feedback of an acknowledgement message from the UE can be rapidly performed, a transmission latency is reduced, and at the same time the number of UEs that can be connected can be increased by several times.

In an embodiment, the flexible subframe is configured to further include a GP, where the GP is located between a downlink transmission symbol and an uplink transmission symbol at transition from the downlink transmission symbol to the uplink transmission symbol.

Reference may be made to the data transmission methods on the base station side for specific implementations of the GP in the flexible subframe.

In some embodiments, the GP is configured to be located between a downlink transmission symbol and an uplink transmission symbol in a same flexible subframe at transition from the downlink transmission symbol to the uplink transmission symbol. Alternatively, the GP is configured to be located between a downlink transmission symbol and an uplink transmission symbol in adjacent flexible subframes at transition from the downlink transmission symbol to the uplink transmission symbol.

In an embodiment, the at least one flexible subframe may include at least one dynamically configured flexible subframe. Accordingly, receiving configuration information of at least one flexible subframe included in a TDD radio frame from a base station in step S701 may be implemented as: periodically receiving, from the base station, structure information of the at least one dynamically configured flexible subframe in the TDD radio frame; and periodically and dynamically configuring a location, occupation information, and a time length of each sub-timeslot in the at least one dynamically configured flexible subframe.

In an embodiment, the at least one flexible subframe may include at least one semi-dynamically configured flexible subframe. The semi-dynamically configured flexible subframe may include at least one fixedly configured timeslot and at least one flexibly configured timeslot. Accordingly, receiving configuration information of at least one flexible subframe included in a TDD radio frame from a base station in step S701 may be implemented as: at a first predetermined period, receiving, from the base station, configuration information of a location, occupation information, and a time length of each fixedly configured timeslot in the at least one semi-dynamically configured flexible subframe in the TDD radio frame; and at a second predetermined period, receiving, from the base station, configuration information of a location, occupation information, and a time length of each flexibly configured timeslot in the at least one semi-dynamically configured flexible subframe in the radio frame. The first predetermined period may be greater than the second predetermined period.

Embodiments of apparatuses of the disclosure are provided below. The apparatuses may be configured to perform the foregoing embodiments of the data transmission methods of the disclosure.

Figure 8:
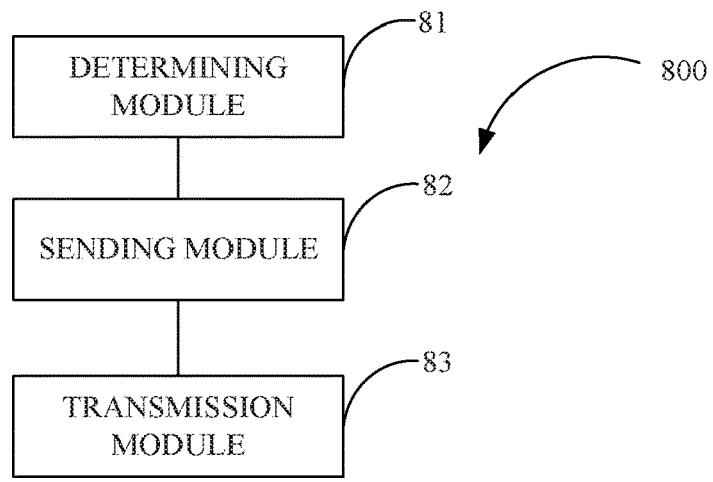
FIG. 8 is a block diagram of an apparatus for data transmission according to an exemplary embodiment.

FIG. 8 is a block diagram of an apparatus 800 for data transmission according to an exemplary embodiment of the disclosure. The apparatus 800 may be used in a base station, and may include a determining module 81, a sending module 82, and a transmission module 83.

The determining module 81 is configured to determine configuration information of at least one flexible subframe included in a TDD radio frame. The flexible subframe is configured to include at least one uplink transmission symbol and at least one downlink transmission symbol, and sub-timeslots occupied by the at least one uplink transmission symbol and the at least one downlink transmission symbol are alternately configured.

The sending module 82 is configured to transmit the determined configuration information of the at least one flexible subframe to a UE by using signaling.

The transmission module 83 is configured to: according to the determined configuration information of the at least one flexible subframe, receive uplink data in the sub-timeslot of the uplink transmission symbol and send downlink data in the sub-timeslot of the downlink transmission symbol.

Figure 9:
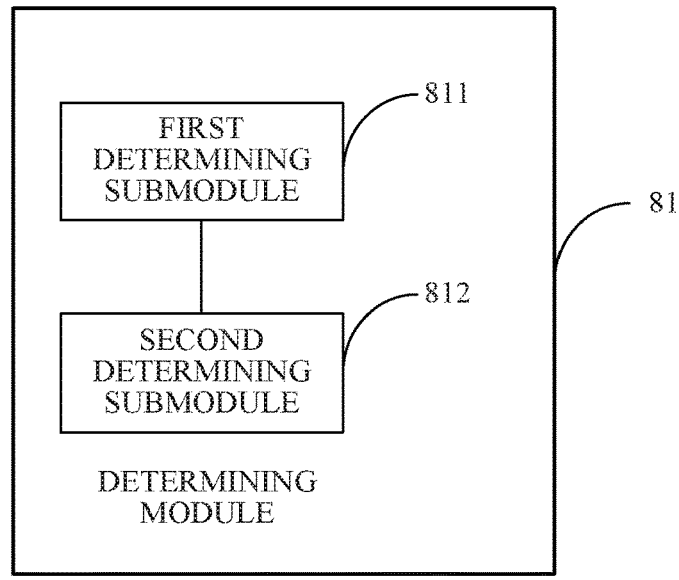
FIG. 9 is a block diagram of a determining module according to an exemplary embodiment.

FIG. 9 is a block diagram of the determining module 81 (FIG. 8), according to an exemplary embodiment. Referring to FIG. 9, the determining module 81 may include a first determining submodule 811 configured to determine configuration information of a GP in the flexible subframe. The GP is located between a downlink transmission symbol and an uplink transmission symbol at transition from the downlink transmission symbol to the uplink transmission symbol.

In an embodiment, the first determining submodule 811 is configured to determine that the GP is located between a downlink transmission symbol and an uplink transmission symbol in the same flexible subframe at transition from the downlink transmission symbol to the uplink transmission symbol. The first determining submodule 811 is also configured to determine that the GP is located between a downlink transmission symbol and an uplink transmission symbol in adjacent flexible subframes at transition from the downlink transmission symbol to the uplink transmission symbol.

The determining module 81 may further include a second determining submodule 812.

The second determining submodule 812 is configured to: for each flexible subframe, determine a location and a time length of a sub-timeslot that is occupied by each uplink transmission symbol and a location and a time length of a sub-timeslot that is occupied by each downlink transmission symbol.

The first determining submodule 811 is further configured to: when the flexible subframe is configured to further include a GP, determine a location and a time length of a sub-timeslot that is occupied by the GP.

In an embodiment, the at least one flexible subframe may include a dynamically configured flexible subframe. Accordingly, the determining module 81 is configured to periodically determine a location, occupation information, and a time length of each sub-timeslot in the dynamically configured flexible subframe.

In an embodiment, the at least one flexible subframe may include a semi-dynamically configured flexible subframe. The semi-dynamically configured flexible subframe may include at least one fixedly configured timeslot and at least one flexibly configured timeslot. Accordingly, the determining module 81 is configured to: at a first predetermined period, determine a location, occupation information, and a time length of each fixedly configured timeslot in the semi-dynamically configured flexible subframe; and at a second predetermined period, determine a location, occupation information, and a time length of each flexibly configured timeslot in the semi-dynamically configured flexible subframe. The first predetermined periodicity is greater than the second predetermined period.

In embodiments of the present disclosure, the signaling may include, but is not limited to, broadcast signaling, RRC signaling, and physical layer signaling.

Figure 10:
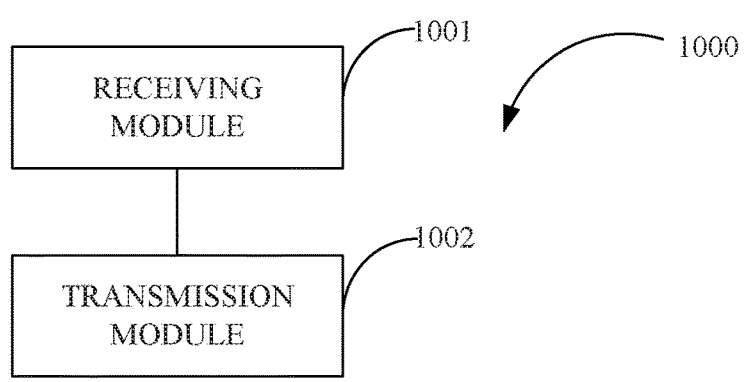
FIG. 10 is a block diagram of an apparatus for data transmission according to an exemplary embodiment.

FIG. 10 is a block diagram of an apparatus 1000 for data transmission according to another exemplary embodiment.

The apparatus 1000 may be used in UE, and may include a receiving module 1001 and a transmission module 1002.

The receiving module 1001 is configured to receive, from a base station, configuration information of at least one flexible subframe included in a TDD radio frame. The flexible subframe is configured to include at least one uplink transmission symbol and at least one downlink transmission symbol, and sub-timeslots occupied by the at least one uplink transmission symbol and the at least one downlink transmission symbol are alternately configured.

The transmission module 1002 is configured to: according to the configuration information of the at least one flexible subframe included in the TDD radio frame, send uplink data in a sub-timeslot of the uplink transmission symbol and receive downlink data in a sub-timeslot of the downlink transmission symbol.

In an embodiment, the receiving module 1001 is configured to receive configuration information of a GP in the flexible subframe. The GP is located between a downlink transmission symbol and an uplink transmission symbol at transition from the downlink transmission symbol to the uplink transmission symbol.

In an embodiment, the receiving module 1001 is further configured to receive the configuration information of the GP in the flexible subframe. The configuration information of the GP may further include one or more of the following: the GP is located between a downlink transmission symbol and an uplink transmission symbol in a same flexible subframe at transition from the downlink transmission symbol to the uplink transmission symbol; and the GP is located between a downlink transmission symbol and an uplink transmission symbol in adjacent flexible subframes at transition from the downlink transmission symbol to the uplink transmission symbol.

In an embodiment, the at least one flexible subframe may include at least one dynamically configured flexible subframe. Accordingly, the receiving module 1001 is configured to periodically receive, from the base station, structure information of the at least one dynamically configured flexible subframe in the TDD radio frame; and periodically and dynamically configure a location, occupation information, and a time length of each sub-timeslot in the dynamically configured flexible subframe.

In an embodiment, the at least one flexible subframe may include at least one semi-dynamically configured flexible subframe. The semi-dynamically configured flexible subframe may include at least one fixedly configured timeslot and at least one flexibly configured timeslot. Accordingly, the receiving module 1001 is configured to: at a first predetermined period, receive, from the base station, configuration information of a location, occupation information, and a time length of each fixedly configured timeslot in the at least one semi-dynamically configured flexible subframe in the TDD radio frame; and at a second predetermined period, receive, from the base station, configuration information of a location, occupation information, and a time length of each flexibly configured timeslot in the at least one semi-dynamically configured flexible subframe in the TDD radio frame. The first predetermined period is greater than the second predetermined period.

Specific manners in which various modules perform operations are already described in detail in the embodiments related to the methods, and will no longer be repeated here.

In the embodiments of the present disclosure, configuration information of at least one flexible subframe included in a TDD radio frame is first determined, where the flexible subframe is configured to include at least one uplink transmission symbol and at least one downlink transmission symbol, and sub-timeslots occupied by the uplink transmission symbol and the downlink transmission symbol are alternately configured; the determined configuration information of the at least one subframe is then sent to UE by using signaling; and uplink data and downlink data are then transmitted according to the configuration information of the at least one flexible subframe. In contrast, in a subframe configuration solution of a TDD radio frame in related prior art, one subframe (uplink subframe or downlink subframe) includes only a same type of transmission symbols (i.e., an uplink subframe includes only uplink transmission symbols, and a downlink subframe includes only downlink transmission symbols). In the embodiments of the present disclosure, configuration of uplink and downlink transmission symbols may be implemented in a same subframe, so that feedback of an acknowledgement message such as an ACK/a NACK from a UE can be rapidly performed, and a transmission latency is reduced desirably.

In the embodiments provided in the present disclosure, a flexible subframe may include a dynamically configured flexible subframe and/or a semi-dynamically configured flexible subframe. A structure of the flexible subframe may be configured completely flexibly or configured partially flexibly, so that configuration of a TDD subframe becomes more flexible, and reconfiguration may be performed according to factors such as service type, network coverage, network capacity, and network interference, thereby fully meeting a requirement of an uplink-downlink asymmetric TDD service.

Further, in some embodiments, using a structure of a semi-dynamically configured flexible subframe to perform data transmission can facilitate saving overheads of control signaling, and facilitate determining which symbols may cause interference during interference cancellation.

Figure 11:
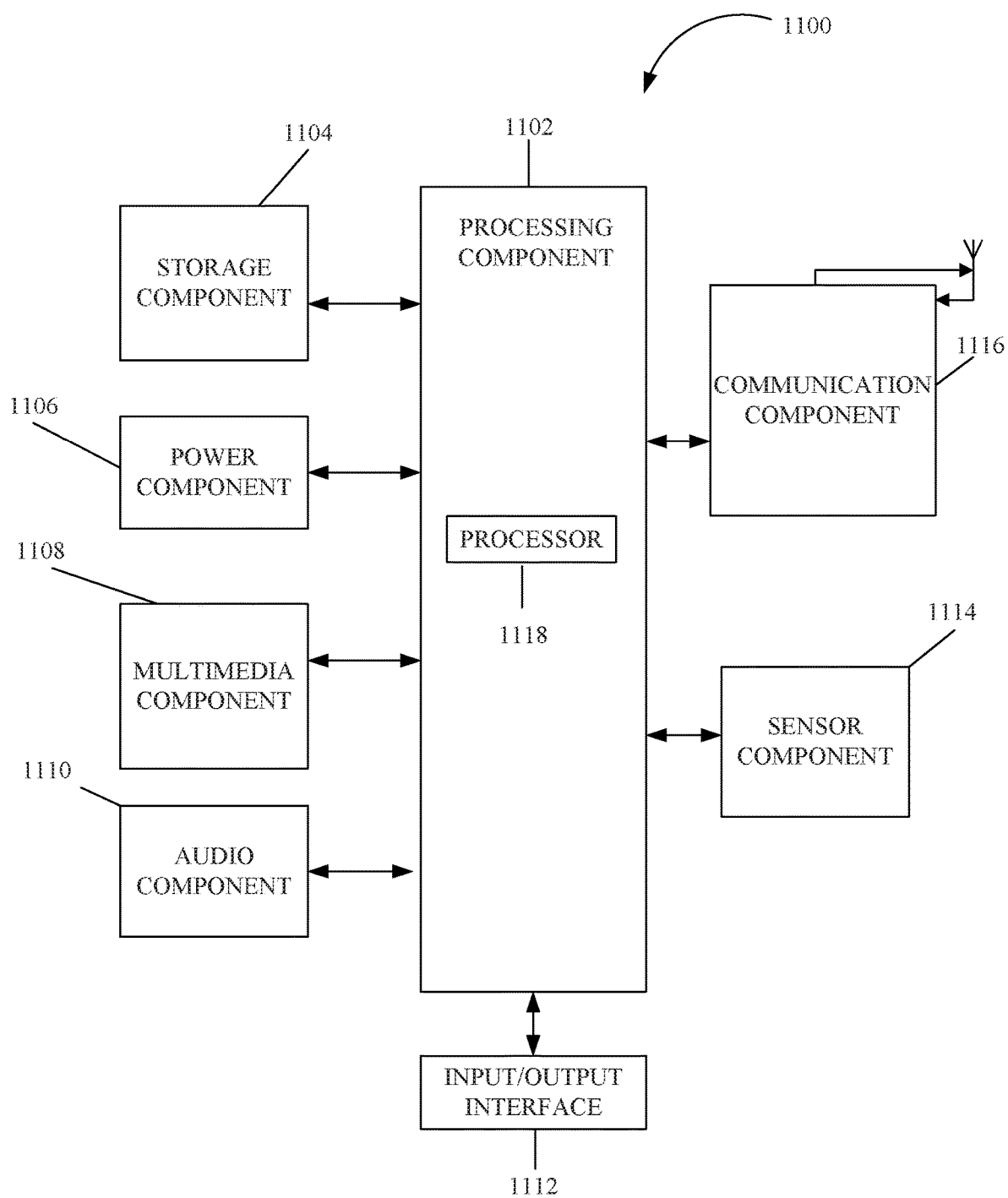
FIG. 11 is a block diagram of an apparatus for data transmission according to an exemplary embodiment.

FIG. 11 is a block diagram of an apparatus 1100 applicable to data transmission according to an exemplary embodiment. For example, the apparatus 1100 may be a mobile phone, a computer, a digital broadcast terminal, a messaging device, a gaming console, a tablet device, a medical device, exercise equipment, a personal digital assistant, and the like.

Referring to FIG. 11, the apparatus 1100 may include one or more of the following components: a processing component 1102, a storage component 1104, a power component 1106, a multimedia component 1108, an audio component 1110, an Input/Output (I/O) interface 1112, a sensor component 1114, and a communication component 1116.

The communication component 1116 includes a bluetooth module supporting a standard Bluethooth Low Enery (BLE) protocol. The bluetooth module includes a control chip and a bluetooth chip connected to the control chip.

The processing component 1102 typically controls overall operations of the apparatus 1100, such as the operations associated with display, telephone calls, data communications, camera operations, and recording operations. The processing component 1102 may include one or more processors 1118 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The storage component 1104 is configured to store various types of data to support the operation of the apparatus 1100. Examples of such data include instructions for any applications or methods operated on the apparatus 1100, contact data, phonebook data, messages, pictures, video, etc. The storage component 1104 may be implemented using any type of volatile or non-volatile memory devices, or a combination thereof, such as a static random access memory (SRAM), an electrically erasable programmable read-only memory (EEPROM), an erasable programmable read-only Memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with the generation, management, and distribution of power in the apparatus 1100.

The multimedia component 1108 includes a screen providing an output interface between the apparatus 1100 and the user. In some embodiments, the screen may include a Liquid Crystal Display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and the rear camera may receive an external multimedia datum while the apparatus 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signal when the apparatus 1100 is in an operation mode, such as a call mode, a recording mode, and a voice recognition mode. The received audio signal may be further stored in the storage component 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the apparatus 1100. For instance, the sensor component 1114 may detect an open/closed status of the apparatus 1100, relative positioning of components, e.g., the display and the keypad, of the apparatus 1100, a change in position of the apparatus 1100 or a component of the apparatus 1100, a presence or absence of user contact with the apparatus 1100, an orientation or an acceleration/deceleration of the apparatus 1100, and a change in temperature of the apparatus 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the apparatus 1100 and other devices. The apparatus 1100 can access a wireless network based on a communication standard, such as WiFi, 2G, or 3G, or a combination thereof. In one exemplary embodiment, the communication component 1116 receives a broadcast signal from an external broadcast management system via a broadcast channel or broadcast associated information. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an Ultra-wideband (UWB) technology, a Bluetooth (BT) technology, and other technologies.

In exemplary embodiments, the apparatus 1100 may be implemented with one or more application specific integrated circuits (ASICs), digital signal processors (DSPs), digital signal processing fevices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the storage component 1104, executable by the processor 1118 in the apparatus 1100, for performing the above-described methods. For example, the non-transitory computer-readable storage medium may be a ROM, a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of submodules.

Other embodiments of the present disclosure will be apparent to those skilled in the art from consideration of the specification and practice of the disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for data transmission, comprising:
  determining configuration information of at least one flexible subframe included in a time division duplex (TDD) radio frame, wherein the at least one flexible subframe comprises a semi-dynamically configured flexible subframe, the semi-dynamically configured flexible subframe comprises at least one fixedly configured timeslot and at least one flexibly configured timeslot, the at least one flexible subframe is configured to include at least one uplink transmission symbol and at least one downlink transmission symbol, and sub-timeslots occupied by the at least one uplink transmission symbol and the at least one downlink transmission symbol are alternately configured, wherein the determining further comprises:
- at a first predetermined period, determining a location, occupation information, and a time length of each fixedly configured timeslot in the semi-dynamically configured flexible subframe; and
- at a second predetermined period, determining a location, occupation information, and a time length of each flexibly configured timeslot in the semi-dynamically configured flexible subframe, wherein the first predetermined period is greater than the second predetermined period;

transmitting the determined configuration information of the at least one flexible subframe to user equipment (UE) by using signaling; and according to the determined configuration information of the at least one flexible subframe, receiving uplink data in a sub-timeslot of the at least one uplink transmission symbol and sending downlink data in a sub-timeslot of the at least one downlink transmission symbol.

2. The method of claim 1, wherein the at least one flexible subframe is further configured to include a guard period (GP), wherein the GP is located between a downlink transmission symbol and an uplink transmission symbol at transition from the downlink transmission symbol to the uplink transmission symbol.

3. The method of claim 2, wherein:
the GP is configured to be located between the downlink transmission symbol and the uplink transmission symbol in a same flexible subframe at transition from the downlink transmission symbol to the uplink transmission symbol; or
the GP is configured to be located between the downlink transmission symbol and the uplink transmission symbol in adjacent flexible subframes at transition from the downlink transmission symbol to the uplink transmission symbol.

4. The method of claim 1, wherein determining configuration information of at least one flexible subframe included in a TDD radio frame comprises:
for each flexible subframe, determining a location and a time length of a sub-timeslot that is occupied by each uplink transmission symbol and a location and a time length of a sub-timeslot that is occupied by each downlink transmission symbol; and
when the at least one flexible subframe is configured to further include a guard period (GP), determining a location and a time length of a sub-timeslot that is occupied by the GP.

5. The method of claim 1, wherein:
the at least one flexible subframe comprises a dynamically configured flexible subframe; and
determining configuration information of the at least one flexible subframe comprises:
periodically determining a location, occupation information, and a time length of each sub-timeslot in the dynamically configured flexible subframe.

6. The method of claim 1, wherein the signaling comprises at least one of: broadcast signaling, radio resource control (RRC) signaling, and physical layer signaling.

7. A method for data transmission, comprising:
receiving, from a base station, configuration information of at least one flexible subframe included in a time division duplex (TDD) radio frame, wherein the at least one flexible subframe comprises a semi-dynamically configured flexible subframe, the semi-dynamically configured flexible subframe comprises at least one fixedly configured timeslot and at least one flexibly configured timeslot, the at least one flexible subframe is configured to include at least one uplink transmission symbol and at least one downlink transmission symbol, and sub-timeslots occupied by the at least one uplink transmission symbol and the at least one downlink transmission symbol are alternately configured, wherein the receiving further comprises:
- at a first predetermined period, receiving, from the base station, configuration information of a location, occupation information, and a time length of each fixedly configured timeslot in the semi-dynamically configured flexible subframe; and
- at a second predetermined period, receiving, from the base station, configuration information of a location, occupation information, and a time length of each flexibly configured timeslot in the semi-dynamically configured flexible subframe, wherein the first predetermined period is greater than the second predetermined period; and according to the configuration information of the at least one flexible subframe, sending uplink data in a sub-timeslot of the at least one uplink transmission symbol, and receiving downlink data in a sub-timeslot of the at least one downlink transmission symbol.

8. The method of claim 7, wherein the at least one flexible subframe is further configured to include a guard period (GP), wherein the GP is located between a downlink transmission symbol and an uplink transmission symbol at transition from the downlink transmission symbol to the uplink transmission symbol.

9. The method of claim 8, wherein:
the GP is configured to be located between the downlink transmission symbol and the uplink transmission symbol in a same flexible subframe at transition from the downlink transmission symbol to the uplink transmission symbol; or
the GP is configured to be located between the downlink transmission symbol and the uplink transmission symbol in adjacent flexible subframes at transition from the downlink transmission symbol to the uplink transmission symbol.

10. The method of claim 7, wherein:
the at least one flexible subframe comprises a dynamically configured flexible subframe; and
receiving configuration information of the at least one flexible subframe comprises:
periodically receiving, from the base station, structure information of the dynamically configured flexible subframe, wherein a location, occupation information, and a time length of each sub-timeslot in the dynamically configured flexible subframe are periodically and dynamically configured.

11. An apparatus for data transmission, comprising:
a processor; and
a memory configured to store instructions executable by the processor, wherein the processor is configured to:
determine configuration information of at least one flexible subframe included in a time division duplex (TDD) radio frame, wherein the at least one flexible subframe comprises a semi-dynamically configured flexible subframe, the semi-dynamically configured flexible subframe comprises at least one fixedly configured timeslot and at least one flexibly configured timeslot, the at least one flexible subframe is configured to include at least one uplink transmission symbol and at least one downlink transmission symbol, and sub-timeslots occupied by the at least one uplink transmission symbol and the at least one downlink transmission symbol are alternately configured, wherein determining the configuration information of the at least one flexible subframe further comprises:
   at a first predetermined period, determining a location, occupation information, and a time length of each fixedly configured timeslot in the semi-dynamically configured flexible subframe;
   at a second predetermined period, determining a location, occupation information, and a time length of each flexibly configured timeslot in the semi-dynamically configured flexible subframe, wherein the first predetermined period is greater than the second predetermined period;
transmit the determined configuration information of the at least one flexible subframe to user equipment (UE) by using signaling; and
according to the determined configuration information of the at least one flexible subframe, receive uplink data in a sub-timeslot of the at least one uplink transmission symbol and send downlink data in a sub-timeslot of the at least one downlink transmission symbol.

12. The apparatus of claim 11, wherein the at least one flexible subframe is configured to further include a guard period (GP), and the GP is located between a downlink transmission symbol and an uplink transmission symbol at transition from the downlink transmission symbol to the uplink transmission symbol.

13. The apparatus of claim 12, wherein:
the GP is configured to be located between the downlink transmission symbol and the uplink transmission symbol in a same flexible subframe at transition from the downlink transmission symbol to the uplink transmission symbol; or
the GP is configured to be located between the downlink transmission symbol and the uplink transmission symbol in adjacent flexible subframes at transition from the downlink transmission symbol to the uplink transmission symbol.

14. The apparatus of claim 11, wherein the processor is further configured to:
for each flexible subframe, determine a location and a time length of a sub-timeslot that is occupied by each uplink transmission symbol and a location and a time length of a sub-timeslot that is occupied by each downlink transmission symbol; and
when the at least one flexible subframe is configured to further include a guard period (GP), determine a location and a time length of a sub-timeslot that is occupied by the GP.

15. The apparatus of claim 11, wherein:
the at least one flexible subframe comprises a dynamically configured flexible subframe; and
the processor is further configured to:
   periodically determine a location, occupation information, and a time length of each sub-timeslot in the dynamically configured flexible subframe.

16. The apparatus of claim 11, wherein the signaling includes at least one of: broadcast signaling, radio resource control (RRC) signaling, and physical layer signaling.

17. An apparatus for data transmission, comprising:
a processor; and
a memory configured to store instructions executable by the processor,
wherein the processor is configured to:
receive, from a base station, configuration information of at least one flexible subframe included in a time division duplex (TDD) radio frame, wherein the at least one flexible subframe comprises a semi-dynamically configured flexible subframe, the semi-dynamically configured flexible subframe comprises at least one fixedly configured timeslot and at least one flexibly configured timeslot, the at least one flexible subframe is configured to include at least one uplink transmission symbol and at least one downlink transmission symbol, and sub-timeslots occupied by the at least one uplink transmission symbol and the at least one downlink transmission symbol are alternately configured, wherein receiving, from the base station, the configuration information of the at least one flexible subframe further comprises:
   at a first predetermined period, receiving, from the base station, configuration information of a location, occupation information, and a time length of each fixedly configured timeslot in the semi-dynamically configured flexible subframe;
   at a second predetermined period, receiving, from the base station, configuration information of a location, occupation information, and a time length of each flexibly configured timeslot in the semi-dynamically configured flexible subframe, wherein the first predetermined period is greater than the second predetermined period; and
according to the configuration information of the at least one flexible subframe, send uplink data in a sub-timeslot of the uplink transmission symbol and receive downlink data in a sub-timeslot of the downlink transmission symbol.

18. The apparatus of claim 17, wherein the processor is further configured to receive configuration information of a guard period (GP) in the at least one flexible subframe, wherein the GP is located between a downlink transmission symbol and an uplink transmission symbol at transition from the downlink transmission symbol to the uplink transmission symbol.

19. The apparatus of claim 18, wherein:
the GP is located between the downlink transmission symbol and the uplink transmission symbol in a same flexible subframe at transition from the downlink transmission symbol to the uplink transmission symbol; or
the GP is located between the downlink transmission symbol and the uplink transmission symbol in adjacent flexible subframes at transition from the downlink transmission symbol to the uplink transmission symbol.

20. The apparatus of claim 17, wherein:
the at least one flexible subframe comprises a dynamically configured flexible subframe, and
the processor is further configured to:
periodically receive, from the base station, structure information of the dynamically configured flexible subframe, wherein a location, occupation information, and a time length of each sub-timeslot in the dynamically configured flexible subframe are periodically and dynamically configured.

21. A non-transitory computer-readable storage medium having stored thereon instructions that, when executed by a processor of an apparatus, cause the apparatus to perform a method for data transmission, the method comprising:
   determining configuration information of at least one flexible subframe included in a time division duplex (TDD) radio frame, wherein the at least one flexible subframe comprises a semi-dynamically configured flexible subframe, the semi-dynamically configured flexible subframe comprises at least one fixedly configured timeslot and at least one flexibly configured timeslot, the at least one flexible subframe is configured to include at least one uplink transmission symbol and at least one downlink transmission symbol, and sub-timeslots occupied by the at least one uplink transmission symbol and the at least one downlink transmission symbol are alternately configured, wherein the determining further comprises:
      at a first predetermined period, determining a location, occupation information, and a time length of each fixedly configured timeslot in the semi-dynamically configured flexible subframe; and
      at a second predetermined period, determining a location, occupation information, and a time length of each flexibly configured timeslot in the semi-dynamically configured flexible subframe, wherein the first predetermined period is greater than the second predetermined period;
   transmitting the determined configuration information of the at least one flexible subframe to user equipment (UE) by using signaling; and
   according to the determined configuration information of the at least one flexible subframe, receiving uplink data in a sub-timeslot of the at least one uplink transmission symbol and sending downlink data in a sub-timeslot of the at least one downlink transmission symbol.

22. The storage medium of claim 21, wherein the at least one flexible subframe is configured to further comprise a guard period (GP), and the GP is located between a downlink transmission symbol and an uplink transmission symbol at transition from the downlink transmission symbol to the uplink transmission symbol.

23. The storage medium of claim 22, wherein:
   the GP is configured to be located between the downlink transmission symbol and the uplink transmission symbol in a same flexible subframe at transition from the downlink transmission symbol to the uplink transmission symbol; or
   the GP is configured to be located between the downlink transmission symbol and the uplink transmission symbol in adjacent flexible subframes at transition from the downlink transmission symbol to the uplink transmission symbol.

24. The storage medium of claim 21, wherein determining configuration information of at least one flexible subframe included in a TDD radio frame comprises:
   for each flexible subframe, determining a location and a time length of a sub-timeslot that is occupied by each uplink transmission symbol and a location and a time length of a sub-timeslot that is occupied by each downlink transmission symbol; and
   when the flexible subframe is configured to further include a guard period (GP), determining a location and a time length of a sub-timeslot that is occupied by the GP.

25. The storage medium of claim 21, wherein:
   the at least one flexible subframe comprises a dynamically configured flexible subframe; and
   determining configuration information of the at least one flexible subframe comprises:
   periodically determining a location, occupation information, and a time length of each sub-timeslot in the dynamically configured flexible subframe.

* * * * *